(12) United States Patent
Chen et al.

(10) Patent No.: US 7,701,619 B2
(45) Date of Patent: Apr. 20, 2010

(54) SCANNING MODULE

(76) Inventors: Kei-Hon Chen, 2F.-1, No. 18-1, Lane 258, Sec. 6, Yanping N. Rd., Shihlin District, Taipei City 111 (TW); Hsin-Tang Chien, 5F.-1, No. 1, Lane 184, Yucheng St., Nangang District, Taipei City 115 (TW)

( * ) Notice: Subject to any disclaimer, the term of this patent is extended or adjusted under 35 U.S.C. 154(b) by 1416 days.

(21) Appl. No.: 10/911,695

(22) Filed: Aug. 5, 2004

(65) Prior Publication Data

US 2005/0052709 A1    Mar. 10, 2005

(30) Foreign Application Priority Data

Aug. 15, 2003  (TW) ............................. 92214831 U

(51) Int. Cl.
*H04N 1/04* (2006.01)
(52) U.S. Cl. .................. 358/474; 358/475; 358/505; 358/1.9
(58) Field of Classification Search ............... 358/474, 358/475, 505, 1.9; 350/464; 359/756
See application file for complete search history.

(56) References Cited

U.S. PATENT DOCUMENTS 7,050,082 B2 *    5/2006  Suzuki et al. ............... 347/241
2004/0264008 A1 * 12/2004  Nishina .................... 359/776

* cited by examiner

*Primary Examiner*—Houshang Safaipour
(74) *Attorney, Agent, or Firm*—Perkins Coie LLP

(57) ABSTRACT

A scanning module is used in a scanner with a glass for placing documents. The scanning module contains a convergent lens set comprised of lenses with different curvatures and a long-stripe shape lined up from a reflector, and starting with the reflector, the lengths of the lenses are shorter and shorter one by one. All the light reflected by the document can be converged by the convergent lens set to an image sensor so that an optimal image completely falls in the image sensor. The convergent lens set shortens the length of the scanning module, rendering a compact scanner.

18 Claims, 4 Drawing Sheets

SCANNING MODULE

BACKGROUND OF THE INVENTION

1. Field of Invention

The invention relates to a scanning module in a scanner.

2. Related Art

In addition to pictures, videos, multimedia, and computer briefing, daily business document processing also demands for digitalization of information. Although paperless offices have not realized yet, scanning has been used in businesses to reduce the use of paper.

The scanner has always been a useful input device. Its operation is very easy. One only needs to open the lid of the scanner, puts the original document on the glass, and covers the lid. The rest of the scanning task is done by using operating software to control the scanning module.

The basic principle of the scanner is to use a mechanical or electronic scanning module to read image points on a document and the convert them into digital information. Since the scanner converts the brightness of light cast from a light source and reflected by the image points on the original document, it is thus called the photoelectric conversion. During the process of the image sensor's reading the original document, light emitted from the light source is projected onto the surface of the document. The light reflected by the document passes lenses and forms an image on the sensor. Through the photoelectric conversion, an output voltage proportional to the concentration of the image is generated. The optical path can be controlled by the lenses.

In recent years, there is a trend to make all electronics as compact as possible, and so are scanners. As shown in FIG. 1, the lenses used in the scanning module 1 of a scanner are in a lens set 11 with a specific total track available on the market. The lens set 11 is provided with a circular lens (not shown). When using this lens set 11, the length L of the scanning module 1 has to be at least 250 mm. If one wants to shorten the total track, there will be distortion at the boundary of the image received by the image sensor 12 and the lens set 11 will have a larger size. Therefore, it is very difficult to minimize the volume of scanners.

SUMMARY OF THE INVENTION

An objective of the invention is to provide a scanning module which lets all the light reflected by the document pass through a convergent lens set so that an optimal image of the document can completely fall on the image sensor. At the same time, the length of the scanning module is reduced to render a compact scanner.

The disclosed scanning module for scanners with a glass on which the document is placed has a case, a light source, a reflector, a convergent lens set, and an image sensor. The case has an accommodation space and an opening connected to the accommodation space. The light source is installed inside the case to emit light. The reflector is installed inside the case, corresponding to the opening, to reflect the light. The convergent lens set is installed inside the case. It contains lenses with different curvatures and long-stripe shapes, and starting with the reflector, the lengths of the lenses are shorter and shorter one by one to completely receive the light reflected from the reflector. The image sensor is installed inside the case to receive the light converged by the convergent lens set. The optimal image of the document thus falls completely on the image sensor.

After the light source emits light, the light passes through the glass and gets reflected by the document. Afterwards, the light passes through the glass again and enters the accommodation space via the opening. The light is then reflected by the reflector and guided to the convergent lens set. The light reflected by the reflector is affected by the lenses in the convergent lens set and converged to the image sensor. Therefore, the image sensor receives the optimal image of the document. Moreover, the length of the scanning module is reduced at the same time, rendering a compact scanner.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
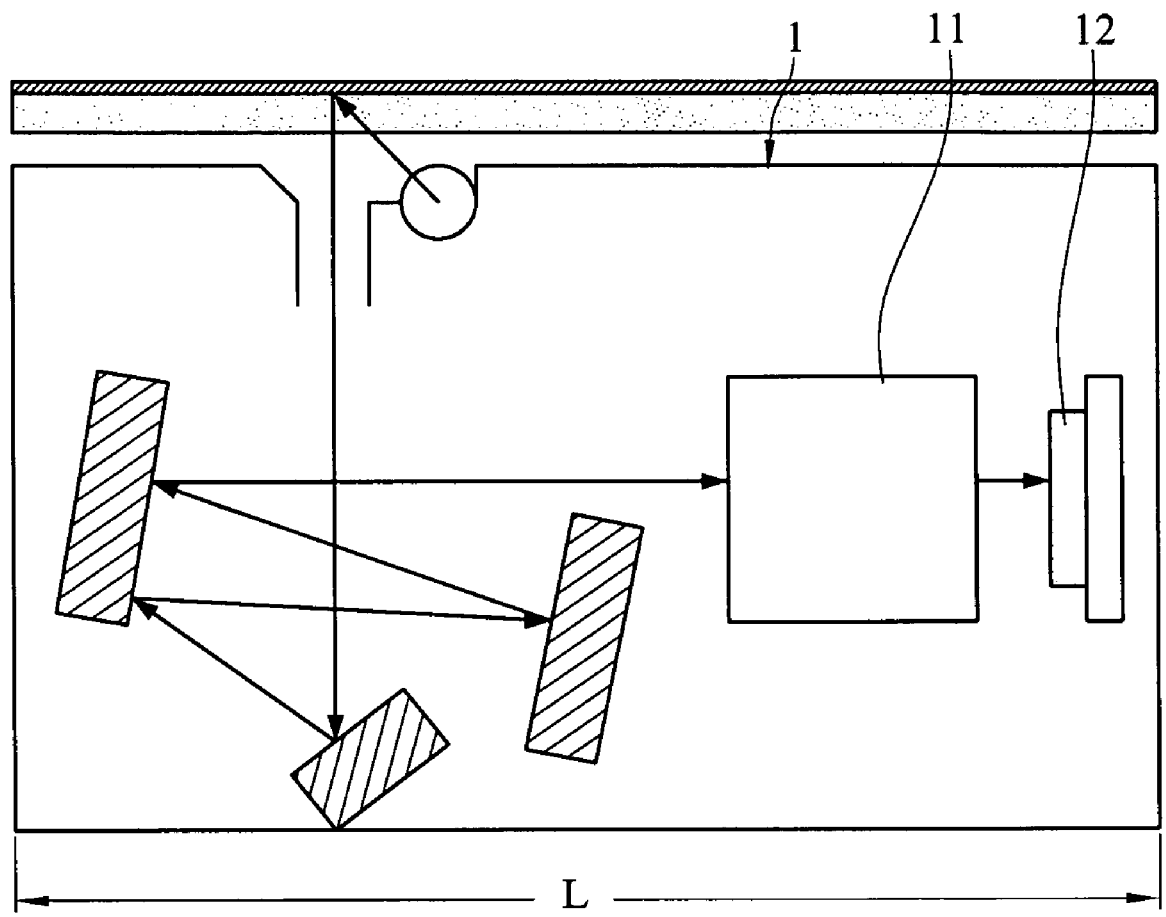
FIG. 1 is a schematic view of a conventional scanning module.
Figure 2:
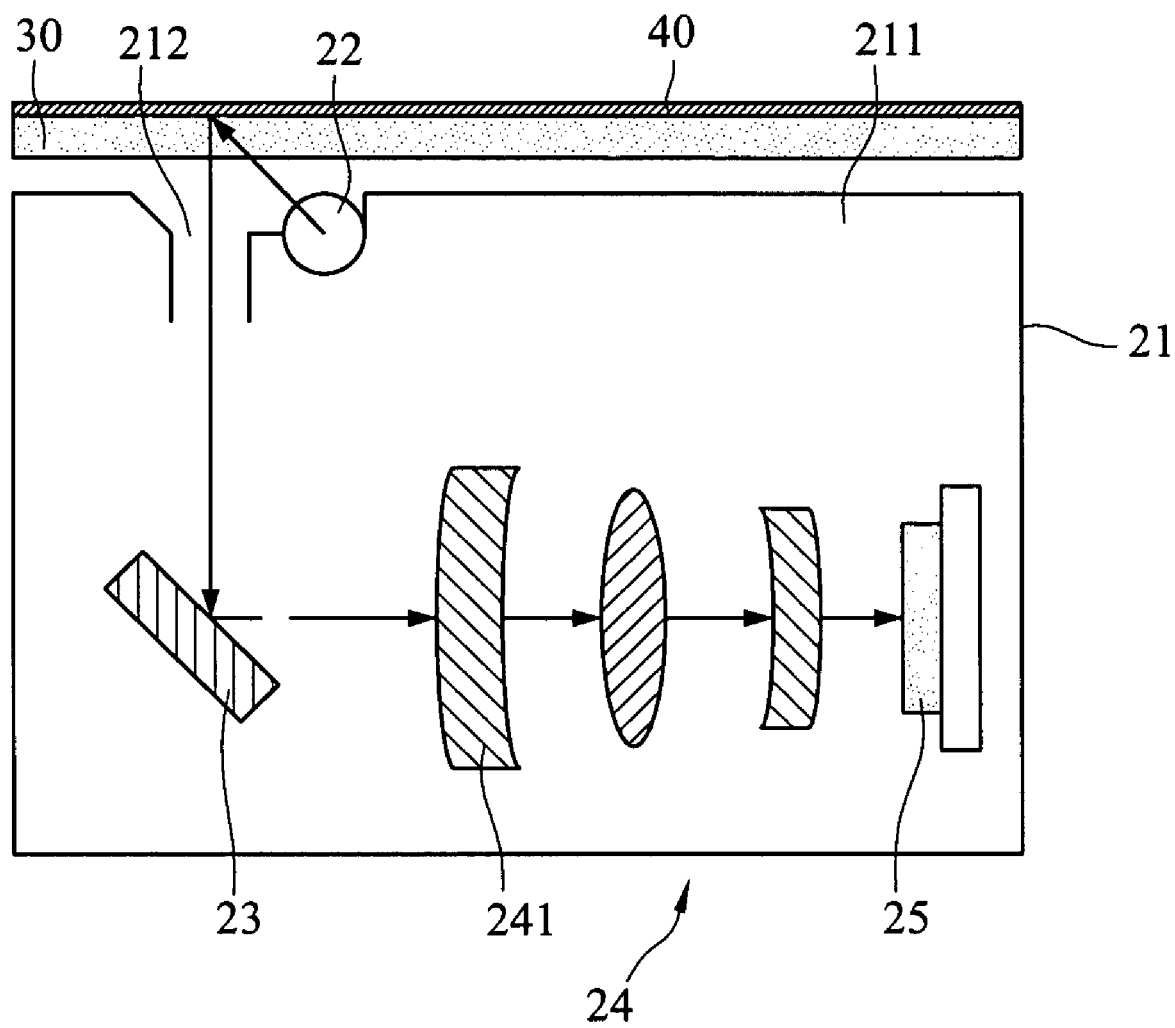
FIG. 2 is a schematic view of the invention.
Figure 3:
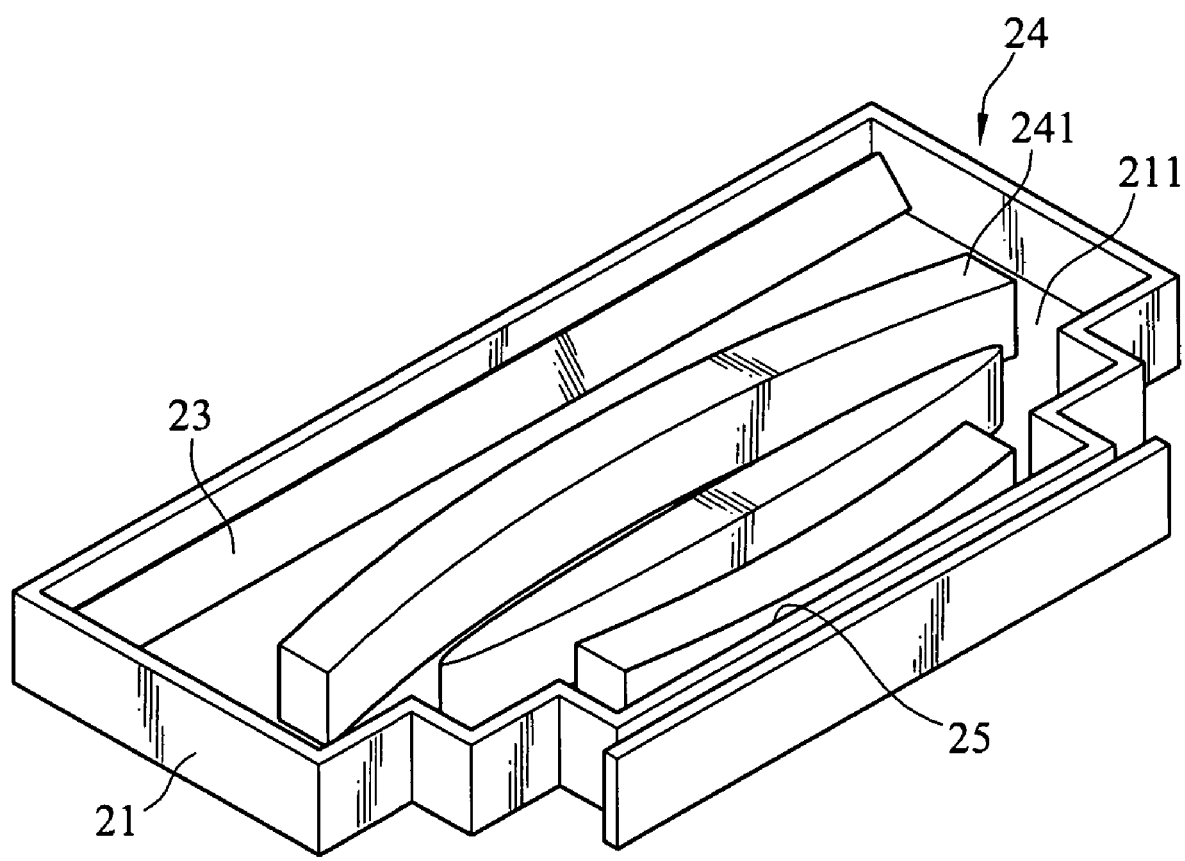
FIG. 3 is a three-dimensional view of the invention.
Figure 4:
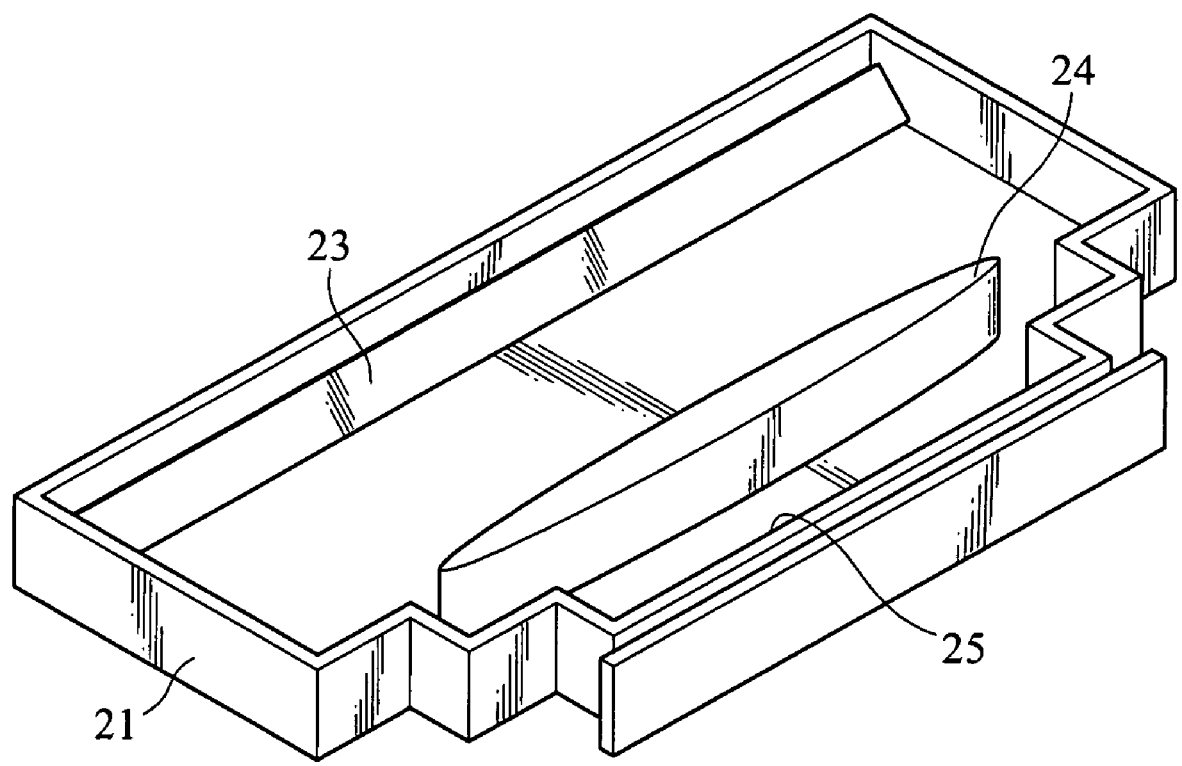
FIG. 4 is a three-dimensional view of the invention.

As shown in FIGS. 2, 3 and 4, the disclosed scanning module is designed for a scanner. The scanner contains a glass 30 for placing a document 40. The scanning module contains a case 21, a light source 22, a reflector 23, a convergent lens set 24, and an image sensor 25.

The case 21 has an accommodation space 211 and an opening 212 connected to the accommodation space 211.

The light source 22 is installed inside the case 21 to emit light. The light goes through the glass 30, gets reflected by the document 40, and enters the accommodation space 211 via the opening 212.

The reflector 23 is installed inside the case 21, corresponding to the opening 212, to reflect the light.

The convergent lens set 24 is installed inside the case 21. It contains lenses 241 with different curvatures and long-stripe shapes, and starting with the reflector 23, the lengths of the lenses 241 are shorter and shorter one by one, to completely receive and converge light reflected from the reflector 23. We have three lenses 241 in the drawing. The sizes of the lenses 241 are longer than those used in the prior art in order to completely receive the light reflected by the reflector 23.

The image sensor 25 is installed inside the case 21 to receive the light converged by the convergent lens set 24. The optimal image of the document 40 thus falls completely on the image sensor 25.

After the light source 22 emits light, the light passes through the glass 30 and gets reflected by the document 40. Afterwards, the light passes through the glass 30 again and enters the accommodation space 211 via the opening 212. The light is then reflected by the reflector 23 and guided to the convergent lens set 24. The light reflected by the reflector 23 is affected by the lenses 241 in the convergent lens set 24 and converged to the image sensor 25. Therefore, the image sensor 25 receives the optimal image of the document 40. Using the long-stripe lenses 241 whose lengths get shorter as they get away from the reflector 23, the optimal image of the document 40 completely falls on the image sensor 25. Moreover, the length of the scanning module is reduced at the same time, rendering a compact scanner.

Certain variations would be apparent to those skilled in the art, which variations are considered within the spirit and scope of the claimed invention.

What is claimed is:

1. A scanning module for a scanner with a glass scanning surface, the scanning module comprising:

a case having an accommodation space and an opening formed therein, wherein the opening is continuous with the accommodation space;

a light source configured to emit light through the glass scanning surface onto a document and into the accommodation space via the opening;

a reflector corresponding to the opening and configured to reflect the light;

a convergent lens set comprising a plurality of lenses with different curvatures and long-stripe shapes configured to receive the light reflected from the reflector; and an image sensor configured to receive the light from the convergent lens set, wherein, starting with a lens of the lens set nearest to the reflector and ending at the image sensor, lengths of the individual lenses are progressively shorter.

2. The scanning module of claim 1, further comprising a lid configured to be placed on the glass scanning surface when the lid is in a closed position.

3. The scanning module of claim 1 wherein the plurality of lenses comprises three lenses.

4. A scanning module, comprising:
a light source configured to emit light onto a scanning surface positioned to receive an object to be scanned;
a convergent lens set comprising a plurality of lenses;
a reflector configured to reflect light from the scanning surface to the convergent lens set; and
an image sensor configured to receive the light from the convergent lens set, wherein each of the plurality of lenses has a shorter length than a previous lens, as ordered from the reflector to the image sensor.

5. The scanning module of claim 4, further comprising an enclosure configured to house at least one of the convergent lens set, the reflector, the light source, or the image sensor.

6. The scanning module of claim 4, further comprising a lid configured to be placed upon the scanning surface when the lid is in a closed position.

7. The scanning module of claim 4 wherein the plurality of convergent lenses comprises three lenses.

8. The scanning module of claim 4 wherein at least two of the plurality of lenses have a different curvature.

9. The scanning module of claim 4 wherein the plurality of lenses comprises at least one lens having a long-stripe shape.

10. The scanning module of claim 4 wherein the scanning surface is positioned to receive a paper document.

11. A scanner configured to receive an object to be scanned, the scanner comprising:
an enclosure comprising a glass surface configured to receive the object to be scanned;
a light source positioned within the enclosure and configured to emit light onto the glass surface and the object;
a reflector configured to receive the light reflected off the object, wherein the light carries an optical image of the object;
a convergent lens set positioned in the enclosure and configured to receive the light from the reflector, the lens set comprising a first lens, a second lens, and a third lens, wherein a length of the first lens is longer than a length of the second lens, and a length of the second lens is longer than a length of the third lens, and wherein the lens set is configured such that the light sequentially passes through the first lens, the second lens, and the third lens; and
an image sensor configured to receive the optical image of the object from the lens set.

12. The scanner of claim 11 wherein at least one of the reflector or the image sensor is positioned within the enclosure.

13. The scanner of claim 11 wherein the object is a paper document.

14. The scanner of claim 11 wherein at least one of the first, second, or third lenses has a long-stripe shape.

15. The scanner of claim 11 wherein the first, second, and third lenses each have a different shape.

16. The scanner of claim 11 wherein at least one of the first, second, or third lenses has a different shape than at least one other of the first, second, or third lenses.

17. The scanner of claim 11 wherein the light from the reflector passes through the first lens, the second lens, and the third lens, sequentially, before impinging upon the image sensor.

18. The scanner of claim 11 wherein the image sensor is configured to receive the optical image of the object and convert the optical image into a digital image.

* * * * *